United States Patent
Mildner

(10) Patent No.: US 9,346,493 B2
(45) Date of Patent: May 24, 2016

(54) FLOOR STRUCTURE OF A MOTOR VEHICLE BODY

(71) Applicant: GM GLOBAL TECHNOLOGY OPERATIONS LLC, Detroit, MI (US)

(72) Inventor: Udo Mildner, Limburg (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/221,109

(22) Filed: Mar. 20, 2014

(65) Prior Publication Data

US 2014/0284965 A1    Sep. 25, 2014

(30) Foreign Application Priority Data

Mar. 20, 2013  (DE) .................. 10 2013 004 793

(51) Int. Cl.
*B60J 7/00* (2006.01)
*B62D 25/20* (2006.01)
*B62D 65/02* (2006.01)

(52) U.S. Cl.
CPC ............ *B62D 25/20* (2013.01); *B62D 25/2018* (2013.01); *B62D 65/02* (2013.01); *Y10T 29/49622* (2015.01)

(58) Field of Classification Search
CPC .. B62D 25/20; B62D 25/025; B62D 25/2027; B62D 25/2036; H01L 2924/00; Y10T 428/24562; Y10T 428/24661; Y10T 428/24826; B60N 2/0705; B60N 2/0715
USPC ................... 296/187.08, 193.07, 203.01, 204
See application file for complete search history.

(56) References Cited

U.S. PATENT DOCUMENTS

| | | | | |
|---|---|---|---|---|
| 4,402,545 | A * | 9/1983 | Utsunomiya et al. | 296/204 |
| 4,557,519 | A * | 12/1985 | Matsuura | 296/204 |
| 4,572,571 | A * | 2/1986 | Malen | 296/193.07 |
| 4,836,600 | A * | 6/1989 | Miyazaki et al. | 296/193.07 |
| 5,102,187 | A * | 4/1992 | Harasaki | 296/204 |
| 5,611,593 | A * | 3/1997 | Fukagawa et al. | 296/204 |
| 5,921,618 | A * | 7/1999 | Mori et al. | 296/187.12 |
| 6,007,145 | A * | 12/1999 | Tezuka | 296/204 |
| 6,015,183 | A * | 1/2000 | Vlahovic | 296/204 |
| 6,460,918 | B1 * | 10/2002 | Sato et al. | 296/204 |
| 6,595,581 | B2 * | 7/2003 | Wolkersdorfer et al. | 296/204 |
| 6,666,501 | B1 * | 12/2003 | Logan et al. | 296/193.07 |
| 6,981,736 | B2 * | 1/2006 | Morsch et al. | 296/193.07 |
| 7,140,642 | B2 * | 11/2006 | Ito et al. | 280/834 |
| 7,810,875 | B2 * | 10/2010 | Gerisch | 296/193.07 |

(Continued)

FOREIGN PATENT DOCUMENTS

DE    1745907 U    5/1957
DE    10108287 A1    9/2001

(Continued)

*Primary Examiner* — Kiran B Patel
(74) *Attorney, Agent, or Firm* — Ingrassia Fisher & Lorenz PC

(57) ABSTRACT

A floor structure of a motor vehicle body is disclosed as having a floor panel and a support structure arranged below the floor panel. Two cross members substantially extend in vehicle transverse direction and are spaced from one another in vehicle longitudinal direction. The end sections of the cross members facing the same vehicle side are connected to one another via a profile part, each substantially extending in vehicle longitudinal direction, which extends along a side member arrangement and supports itself on the side member arrangement.

15 Claims, 7 Drawing Sheets

(56) References Cited

U.S. PATENT DOCUMENTS

| | | | |
|---|---|---|---|
| 8,177,293 B2* | 5/2012 | Boettcher | 296/204 |
| 8,276,980 B2* | 10/2012 | Boettcher et al. | 296/193.07 |
| 8,733,822 B2* | 5/2014 | Yoshida | 296/187.08 |
| 8,960,776 B2* | 2/2015 | Boettcher et al. | 296/193.07 |
| 2001/0028179 A1* | 10/2001 | Takemoto et al. | 296/204 |
| 2005/0082877 A1* | 4/2005 | Gotou et al. | 296/204 |
| 2007/0126264 A1* | 6/2007 | Mizuma et al. | 296/204 |
| 2008/0315629 A1* | 12/2008 | Abe et al. | 296/193.07 |
| 2009/0179461 A1* | 7/2009 | Fuchs et al. | 296/204 |
| 2009/0243343 A1* | 10/2009 | Tamakoshi | 296/204 |
| 2009/0289476 A1* | 11/2009 | Bufe et al. | 296/204 |
| 2010/0244496 A1* | 9/2010 | Bellanger et al. | 296/204 |
| 2011/0068606 A1* | 3/2011 | Klimek et al. | 296/187.08 |
| 2011/0133518 A1* | 6/2011 | Wanke et al. | 296/203.02 |
| 2011/0241386 A1* | 10/2011 | Mildner et al. | 296/204 |
| 2011/0266838 A1* | 11/2011 | Leopold | 296/193.07 |
| 2012/0049582 A1* | 3/2012 | Klimek et al. | 296/204 |
| 2012/0068499 A1* | 3/2012 | Mildner et al. | 296/193.07 |
| 2012/0091777 A1* | 4/2012 | Mildner et al. | 297/378.1 |
| 2012/0119545 A1* | 5/2012 | Mildner et al. | 296/193.07 |
| 2012/0139297 A1* | 6/2012 | Mildner et al. | 296/204 |
| 2012/0248822 A1* | 10/2012 | Mildner et al. | 296/193.07 |
| 2012/0274100 A1* | 11/2012 | Mildner et al. | 296/193.07 |
| 2013/0088045 A1* | 4/2013 | Charbonneau et al. | 296/187.12 |
| 2013/0093217 A1* | 4/2013 | Mildner et al. | 296/203.04 |
| 2013/0099526 A1* | 4/2013 | Mildner et al. | 296/193.07 |
| 2013/0134742 A1* | 5/2013 | Mildner et al. | 296/203.02 |
| 2013/0161981 A1* | 6/2013 | Mildner | 296/203.02 |
| 2013/0229030 A1* | 9/2013 | Yamaguchi et al. | 296/193.07 |
| 2013/0257103 A1* | 10/2013 | Mildner et al. | 296/193.07 |
| 2013/0257105 A1* | 10/2013 | Mildner et al. | 296/204 |
| 2013/0278021 A1* | 10/2013 | Mildner | 296/193.07 |
| 2013/0313860 A1* | 11/2013 | Yamaji et al. | 296/193.07 |
| 2014/0170342 A1* | 6/2014 | Peitz | 428/34.1 |
| 2014/0183905 A1* | 7/2014 | Chikazawa | 296/187.08 |
| 2014/0203595 A1* | 7/2014 | Mochizuki | 296/193.07 |
| 2014/0284965 A1* | 9/2014 | Mildner | 296/187.08 |
| 2014/0338996 A1* | 11/2014 | Baccouche et al. | 180/68.5 |
| 2015/0042128 A1* | 2/2015 | Kowaki | 296/193.07 |

FOREIGN PATENT DOCUMENTS

| | | |
|---|---|---|
| DE | 102010051270 A1 | 5/2012 |
| DE | 102011015541 A1 | 10/2012 |
| DE | 102011117682 A1 | 5/2013 |

* cited by examiner

A-A

B-B

C-C

D-D

FLOOR STRUCTURE OF A MOTOR VEHICLE BODY

CROSS REFERENCE TO RELATED APPLICATION

This application claims priority to German Patent Application No. 102013004793.5 filed Mar. 20, 2013, which is hereby incorporated by reference in its entirety.

TECHNICAL FIELD

The present disclosure relates to a floor structure of a motor vehicle body having a floor panel and a support structure arranged below the floor panel, which is designed as a seat support structure for fastening vehicle seats to the floor structure.

BACKGROUND

In motor vehicle body construction there exist various concepts for realizing a floor structure to be provided, for example, in the region of a passenger compartment of the motor vehicle. Known floor structures typically have a center tunnel extending over almost the entire length of the passenger compartment and running in the middle above the floor structure and seat cross members separately provided for fastening vehicle seats which are arranged on the top side of a floor panel. The actual floor panel in this case is mostly formed in multiple parts, and typically adjoins the center tunnel approximately laterally with individual floor panel segments.

Thus, a floor structure of a motor vehicle body with a floor panel is known, for example from DE 10 2011 015 541 A1, wherein a seat support structure is provided below the floor panel. The floor panel in this case includes two floor sections adjoining one another in vehicle longitudinal direction (x), which, based on the vehicle vertical direction (z), are arranged offset to one another. The seat support structure in this case has at least one transverse structure stabilizing the floor section in the region of the floor section located higher with two cross members which are spaced from one another in vehicle longitudinal direction (x). A front cross member and a rear cross member in this case lie on two lateral side members substantially extending in vehicle longitudinal direction (x) and are fastened thereon. The ends of those cross members in this case are only joined to the side members of the vehicle body with their end sections located opposite in a point-like manner.

In contrast with this, the present disclosure is based on the object of providing a floor structure of a motor vehicle body which is improved with respect to its bending and structural stiffness. This is to contribute to increasing possible oscillation natural frequencies of the motor vehicle body in order to counteract possible resonance and vibration effects which develop during the operation of the vehicle. In addition to this, the floor structure is to provide improved occupant protection and optimize an intrusion behavior of the motor vehicle body, for example, in the region of the passenger compartment upon a lateral or laterally offset impact of the body against an obstacle, such as against a post or tree.

In addition to this, the present disclosure provides an increased torsional stiffness of the motor vehicle body and of the seat fastening, which is preferably accompanied by a weight reduction and which furthermore, makes possible a preferably simple, production-rational and cost-effective fabrication of the body.

SUMMARY

Accordingly, a floor structure of a motor vehicle body is provided, which includes a floor panel and a support structure arranged below the floor panel. The support structure includes two cross members which are spaced from one another in vehicle longitudinal direction (x) and substantially extend in vehicle transverse direction (y). End sections of the cross members located opposite are connected to one another via a profile part each substantially extending in vehicle direction (x).

Here, the end sections of the cross members which face the same vehicle side are connected to one another by means of the profile part. Based on the geometry of the floor structure, the end sections of the two cross members facing a left vehicle side are connected to one another via a left profile part, while right end sections of the two cross members located opposite are connected to one another via a right profile part. The profile parts which connect the cross members to one another extend along a side member arrangement of the floor structure and support themselves on the side member support structure.

Here, it is provided that the profile parts over their entire extension support themselves over the side member arrangement, each being provided on the left or right on the floor structure. In this way, an alternating contact surface of profile part and side member arrangement can be maximized. In that a single profile part is simultaneously connected to the end sections of both cross members spaced from one another in vehicle longitudinal direction (x), the cross members cannot only be subjected to a point-like support but to a comparatively large-area support on the side member arrangement via the profile part.

By means of the profile part, the end sections of the cross members can be separately connected to one another, and accordingly be fastened to the side member arrangement in a reinforced manner. In the case of external load actions into the floor structure, such as during a side impact, forces acting on the floor structure approximately in the middle between the cross members can be transmitted via the profile part in a more controlled and quite even manner onto both cross members and accordingly discharged into the floor structure.

In this way, the bending and torsional stiffness of the floor structure, thus of the entire vehicle body, can be increased. Furthermore, in a region located between the cross members further body components such as a B-pillar can adjoin the floor structure. Through the structural reinforcement of the floor structure by means of the profile, body components adjoining in such a manner can be formed under certain conditions in a more thin-walled manner or with a reduced number of parts or components so that altogether a weight saving can result.

According to a further configuration, the side member arrangement includes an inner side sill profile and a longitudinal frame profile. Side sill profile and longitudinal frame profile in this case can run adjoining one another substantially in vehicle longitudinal direction (x). The longitudinal frame profile in this case is formed as an extension extending against the travelling direction of a side member adjoining the front wall of the motor vehicle body.

The two-part configuration of the side member arrangement is advantageous for the connecting of the profile part in that the profile part can support itself along both profiles, side sill profile and longitudinal frame profile. Here it is provided that the profile part connecting the two cross members to one another extends both along the side sill profile and also along the longitudinal frame profile, and that the profile part furthermore is structurally connected both to the side sill profile and also to the longitudinal frame profile.

Here, multiple structural connections of the profile part both to the side sill profile and also to the longitudinal frame profile is provided. Transverse force action into the floor structure can thus be particularly favorably transmitted from the side member arrangement to the profile part, and finally discharged into both cross members which are connected to the profile part.

According to a further development, it is provided that the profile part supports itself on an inner side of the inner side sill profile. Because of this it can be achieved that the two end sections of the cross members which are connected to the profile part also come to contact the side sill profile on the inside. Any forces acting or deformations acting on the side sill profile from the outside can thus be discharged into the cross members at the face end.

Through this arrangement, the cross members can structurally reinforce the inner side sill profile combined with the respective profile part provided on the left and right and improve its intrusion or deformation behavior.

According to a further configuration, the profile part is formed as a closing plate for the longitudinal frame profile. Profile part and longitudinal frame profile can in this regard form a closed hollow profile. Upon an arrangement of the longitudinal frame profile on the side sill profile and with the additionally provided supporting of the profile part on the side sill profile the hollow profile of the side member arrangement can also be formed by the longitudinal frame, the profile part and the side sill profile. Profile sections of the longitudinal frame profile located opposite can thus be connected on the one hand to the profile part connecting the cross members and on the other hand to the side sill profile, while the profile part acting as closing plate can be connected on the one hand to the longitudinal frame profile and on the other hand to the side sill profile.

Through supporting and structurally connecting the profile part both on the side sill profile as well as on the longitudinal frame profile a described hollow profile can be formed, by means of which the bending and torsional stiffness as well as the overall stability of the side member arrangement can be increased.

According to a further configuration, the cross members which in vehicle longitudinal direction (x) are arranged offset relative to one another form a closed, largely rectangular support frame with the lateral profile parts connecting them for the floor panel to be fastened thereto. The configuration of a support frame formed by cross members and lateral profile parts makes possible a modular design of the floor structure. Thus, the support frame formed approximately rectangularly can be connected to the floor panel even prior to its assembly on the remaining floor structure, for example to the side member arrangement and thereby form a floor module.

The floor module thus formed can then be connected into a preconfigured structural unit with the remaining floor structure, for example, with the side member arrangements. The modular design, and in particular the advance arranging of the floor panel on the support frame makes possible forming individual structural connections of the components of the floor structure without access openings in the floor structure components. For example, the profile parts do not have to be provided for this purpose which usually act as access openings for welding tools or similar connecting means.

According to a further configuration, a front end section of the floor panel is connected to a left and to a right reinforcement profile. Left and right reinforcement profile in this case come to lie on opposite sides of a center tunnel. The two reinforcement profiles typically have a Z-shaped cross-sectional profile, wherein a rear flange section facing the front floor panel section is connected to the floor panel and/or to the front cross member of the floor structure, and wherein a profile section adjoining hereon and extending approximately vertically downwards acts as a kind of heel plate section, which forms a height offset between a front floor panel section and a floor panel section formed elevated and which adjoins hereon against the travelling direction.

The reinforcement profiles are formed overlapping or covering in vehicle transverse direction (y) and typically have a recess or a formed region, with which the reinforcement profiles can adjoin opposite sides of the center tunnel. In this regard, the left and right reinforcement profiles can form a further structural support for the longitudinal frame profile in vehicle transverse direction (y).

According to a further configuration, a structure-reinforcing insert piece is arranged between front cross member and at least one of the left or right reinforcement profiles. The insert piece can, for example, be provided in the overlap or connecting region of left and right reinforcement profile and can be arranged approximately in extension of a center tunnel, and serve for the structural reinforcement of the floor structure and the floor panel connection to the center tunnel.

According to a further configuration, left and right reinforcement profile are formed concavely curved at least in sections. The concave curvature in this case can be provided for adjoining the insert piece or adjoining the center tunnel. The reinforcement profile which in the plane that is formed by vehicle longitudinal direction (x) and vehicle vertical direction (z) and is approximately formed Z-shaped can follow an approximately L-shaped course formed in the plane formed by vehicle longitudinal direction (x) and vehicle transverse direction (y), wherein a short leg of the reinforcement profile substantially extending in vehicle longitudinal direction (x) can support itself in vehicle transverse direction (y) on the insert piece and/or on the center tunnel.

The concavely curved section in this case can have a curvature of approximately 90°, so that a longer leg of the L-shaped contour of the reinforcement profile following the shorter leg substantially extends in vehicle transverse direction (y). Through the arrangement of the reinforcement profile adjoining the insert piece and/or the center tunnel the transverse forces which are typically directed to the inside and which act on the reinforcement profile can be comparatively homogenously discharged or transferred into the center tunnel or into the reinforcement profile.

According to a further configuration, the outer ends, or the end sections of the reinforcement profiles located outside in vehicle transverse direction (y), support themselves on the inside on the side member arrangement, for example, on the inner sill profile. In this way, an additional support of the sill profile in vehicle transverse direction (y) can be formed. The inner sill profile can thus support itself not only via the cross member on the opposite sill profile, but via the reinforcement profile also directly on the center tunnel which is located approximately in the middle in the vehicle.

According to a further embodiment, the front cross member and at least one of the right or left reinforcement profiles form a closed hollow profile. The corresponding hollow profile in this case is formed, for example, in the plane that is formed by vehicle longitudinal direction (x) and vehicle vertical direction (z). Through the hollow profile configuration of front cross member and reinforcement profile the region of the support frame or of the floor module formed by support frame and floor panel located in the front in travelling direction can also be already formed particularly stable, and torsionally stiff even prior to installation in the motor vehicle body.

As a further development thereof, the hollow profile can also be formed by the front cross member, at least one the right or left reinforcement profile and the insert piece in a region approximately located in the middle between the profile parts, wherein the insert piece delimits the hollow profile in travelling direction.

According to a further development, the side member arrangement is formed continuously in a connecting region located in contact position with the profile part interconnecting the cross members. This means the side member arrangement has no through-openings or such structurally weakening contours in the connecting region to the profile part which would be required as access possibility for any connecting means, for example, welding tongs.

Such a through hole-free configuration of the side member arrangement can be achieved through the module construction and assembly of the floor structure. Since usual through-openings for welding tools which were usual up to now are now no longer a mandatory requirement, the stability and integrity of the side member arrangement, of its longitudinal frame profile and of its side sill profile can be advantageously increased.

Finally it is provided according to a further configuration that at least one of the cross members in a connecting region adjoining the lateral profile part has cross-sectional profile which becomes larger. Thus, at least one of the cross members, for example starting out from a middle section towards the outside, have a cross-sectional profile facing in vehicle transverse direction which continuously becomes larger. Through a cross-sectional structure which diverges towards the outside and becomes larger in such a manner the mechanical load absorption and a corresponding force discharge in the case of forces acting laterally into the floor structure can be improved and increased.

According to a further independent aspect, a motor vehicle body is finally provided, which has a previously described floor structure.

Furthermore, a motor vehicle is provided which is equipped with the previously described floor structure.

Finally, according to a further independent aspect, a production method for producing or forming a previously described floor structure is provided. In a first step, a support structure is formed here, which includes two cross members substantially extending in vehicle transverse direction (y) which are spaced from one another in vehicle longitudinal direction (x).

Here, the lateral end sections of the cross members, in particular those which face the same vehicle side, are each connected to a profile part substantially extending in vehicle longitudinal direction. This produces an approximately rectangular support structure with a front and rear cross member and a left and a right profile part.

The support structure thus formed is then connected to a floor panel, which is placed onto the support structure and structurally connected to support structure. In particular, the floor panel is welded to the support structure for forming a preconfigured floor module.

Following its completion, the floor module is arranged on two side member arrangements which are spaced from one another in vehicle transverse direction (y) and connected to these. The floor module preconfigured and provided with the floor panel in such a manner makes possible a connection to the side member arrangement without any through or access openings for connecting means, such as for example for welding tools, having to be provided in the side member arrangements. In this regard, the side member arrangements can be formed free of through-openings.

In a further development, the floor module can furthermore be provided with left and right reinforcement profiles, which are to be provided adjoining a front end section of the floor panel. Furthermore, the floor module can be provided with an insert piece that has to be arranged on the front cross member approximately in the middle, which together with the front cross member and with at least one right or left reinforcement profile can form a hollow profile in the region of the front cross member.

BRIEF DESCRIPTION OF THE DRAWINGS

The present disclosure will hereinafter be described in conjunction with the following drawing figures, wherein like numerals denote like elements, and.

Further objectives, features and advantageous configurations and application possibilities of the floor structure are explained in the following description of exemplary embodiments making reference to the figures. Here it shows.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
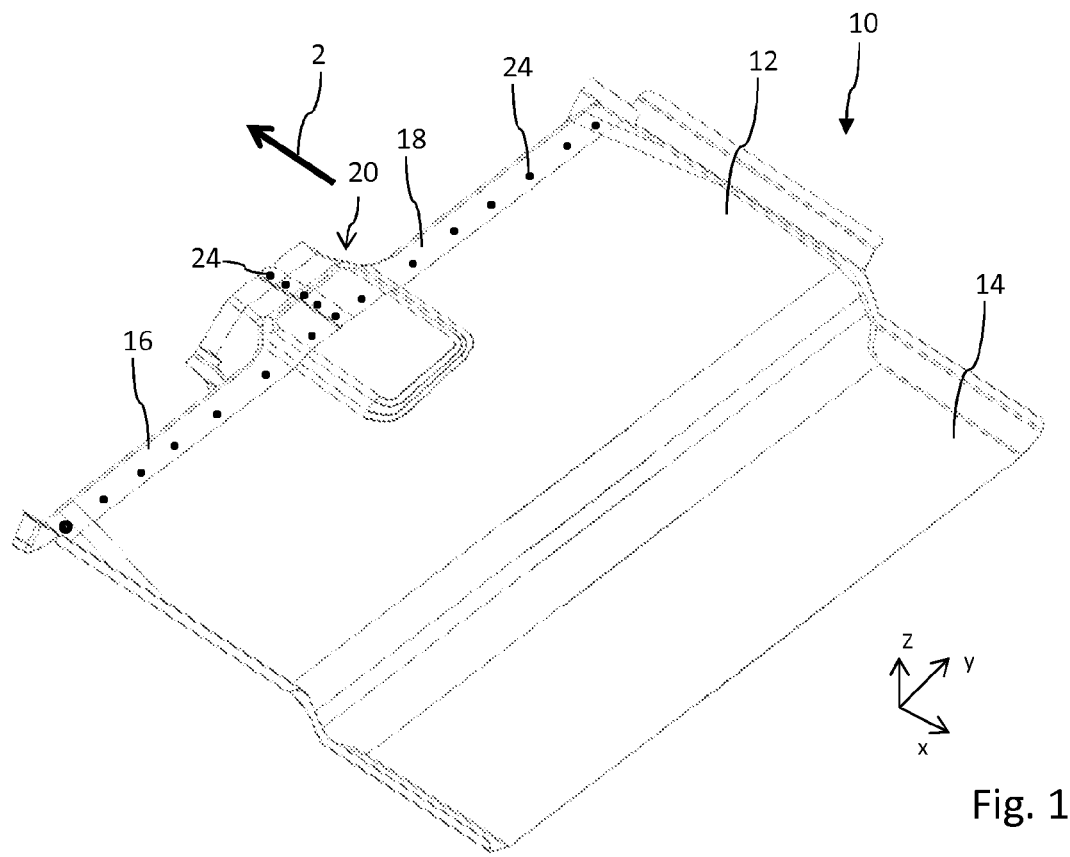
FIG. 1 is a perspective and isolated representation of the floor panel provided with reinforcement profiles.

FIG. 1 shows a floor panel 10 with a floor panel section 12 which is substantially formed flat and elevated and with a rear floor panel section 14 adjoining thereon against the travelling direction 2 of the motor vehicle. The rear floor panel section 14 is arranged with respect to the vehicle vertical direction (z) offset from the elevated, middle floor panel section 12. It is located slightly lower than the middle floor panel section 12.

The floor panel 10, the region of the elevated floor panel section 12 located at the front in travelling direction 2 is furthermore provided with a left floor panel reinforcement 16 and with a right floor panel reinforcement 18. The two floor panel reinforcements 16, 18 shown in FIG. 2 in isolated perspective representation each have an approximately L-shaped contour in the x-y plane considered on its own. In the x-z plane, the left and the right floor panel reinforcement 16, 18 are formed approximately Z-shaped.

The reinforcement profiles 16, 18 are arranged overlapping towards the vehicle middle and form a corresponding overlap region 20. As is indicated in FIG. 1, the two reinforcement profiles 16, 18 are multiply structurally connected to one another in their overlap region 20. Here, structural connecting techniques provide for example welding connections, riveting connections, gluing connections but also a penetration joining of overlapping sheet metal components. Representative of all mentioned connecting types, various spot welds 24 are indicated for example in FIG. 1. As shown there, the two reinforcement profiles 16, 18 are connected to one another in the overlap region 20 substantially extending in vehicle longitudinal direction (x).

Figure 3:
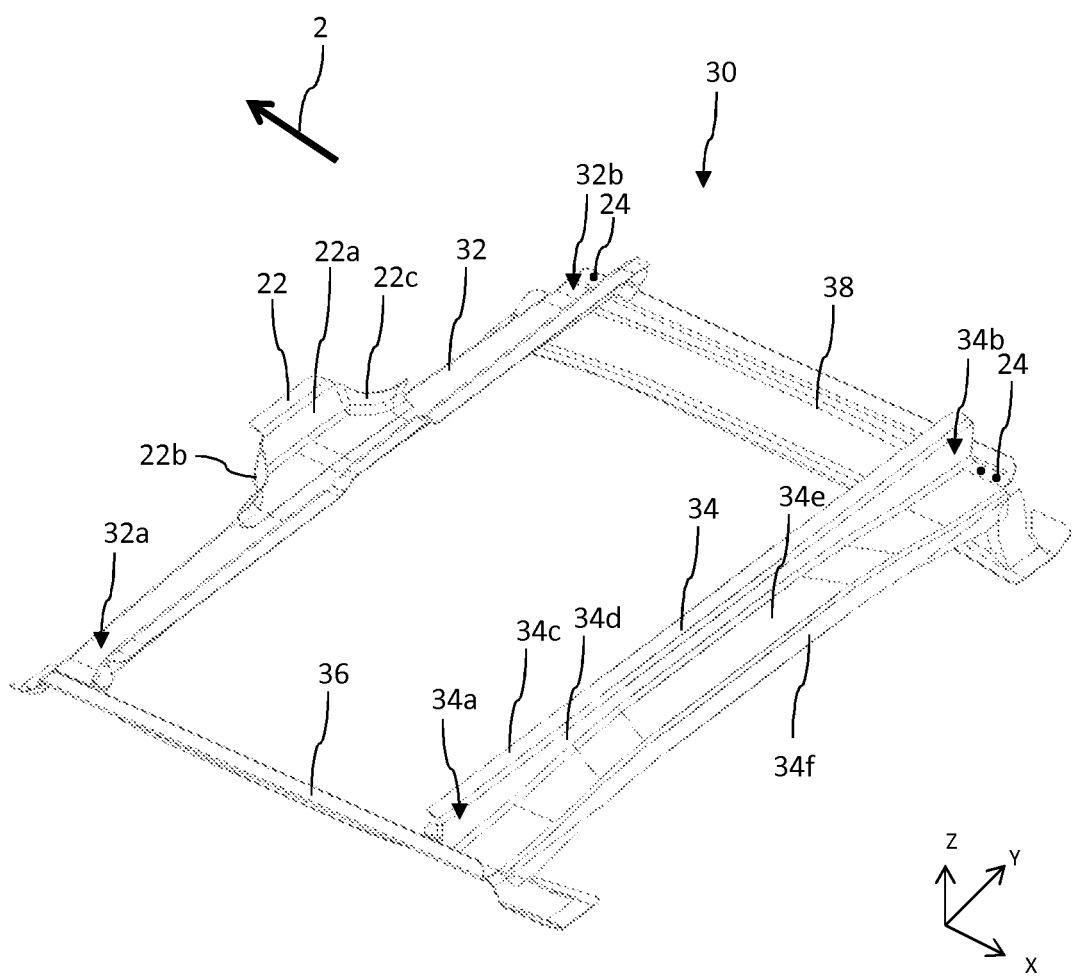
FIG. 3 is a perspective representation of a support frame carrying the floor panel viewed obliquely from the back.

The front end section of the elevated floor panel section 12 furthermore is supported on a rear flange section 16a, 18a of the two reinforcement profiles 16, 18 extending approximately horizontally. In that overlap region, the reinforcement profiles 16, 18 are each structurally connected separately to the front end section of the floor panel section 12. FIG. 3 shows a support frame 30 which includes two cross members 32, 34 which are spaced from one another in vehicle longitudinal direction (x). The end sections 32a, 34a as well as 32b, 34b of the cross members 32, 34 facing the same vehicle side are each connected to one another via a profile part 36, 38 extending approximately in vehicle longitudinal direction (x).

The cross members 32, 34 with the two profile parts 36, 38 form the support frame 30 which is closed in circumferential direction and formed approximately rectangularly. The cross members 32, 34 are formed double L-shaped in cross section. That double L-shaped contour is illustrated on the example of the rear cross member 34 in FIG. 3. Facing in travelling direction 2 and on its front end section, the rear cross member 34 includes a flange section 34c oriented approximately horizontally for supporting the floor panel section 12. Adjoining this, a profile section 34d projecting downwards and extending approximately vertically is provided, which in turn merges into a profile section 34e projecting to the back and substantially extending horizontally. The rear end of that horizontal profile section 34e finally merges into a flange section 34f projecting downwards.

The front cross member 32 has a double L-shaped cross-sectional contour corresponding herewith. As becomes clear by means of FIG. 3 at least the rear cross member 34, preferably also the front cross member 32, has a cross-sectional profile which becomes larger towards its longitudinal ends 34a, 34b and 32a, 32b respectively. As is evident from the rear cross member 34 in FIG. 3, the approximately vertically oriented profile section 34d, starting out approximately from the middle of the cross member 34, is subjected to a steady enlargement towards its lateral end sections 34a, 34b. Through such a diverging configuration, a load and force transmission between the profile parts 36 and 38 and the cross members 32, 34 can be improved.

In FIG. 3, an insert piece 22 which is provided approximately in the middle on the front cross member 32 is shown. This includes a front wall section 22a extending approximately in the y-z plane with sections 22b, 22c which adjoin thereon and are curved in the x-y plane. Those curved sections 22b, 22c of the insert piece 22 are formed corresponding to corresponding curvatures 16c, 18c of the reinforcement profile 16, 18 shown in FIG. 2. Because of those curved sections 18c, 16c as well as 22b, 22c an improved load transmission in vehicle transverse direction (y), for example into a center tunnel 5 shown in FIG. 5 can take place.

Figure 2:
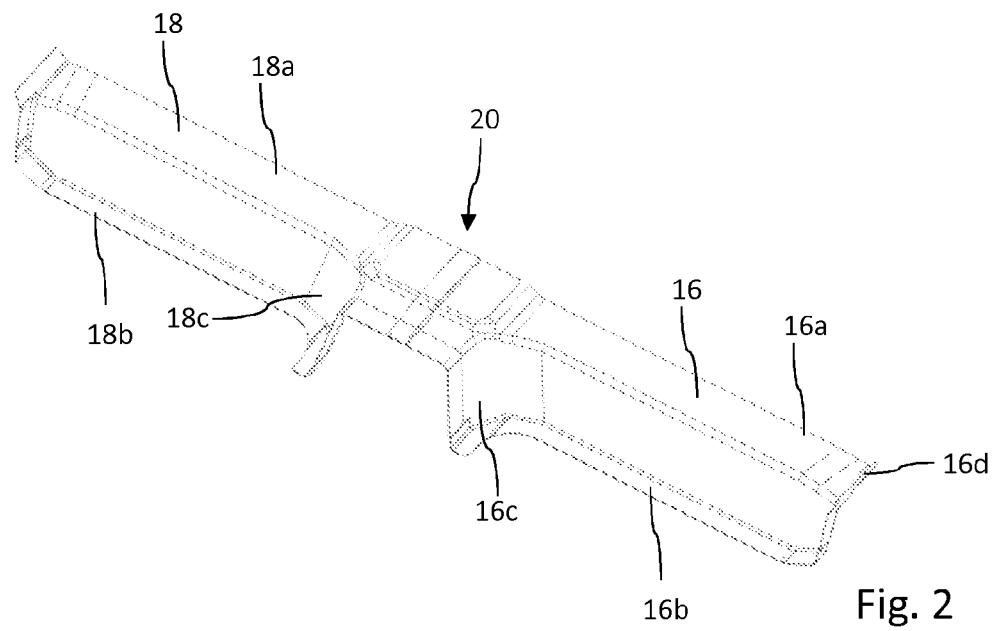
FIG. 2 is a perspective representation of the two reinforcement profiles viewed obliquely from the front.
Figure 6:
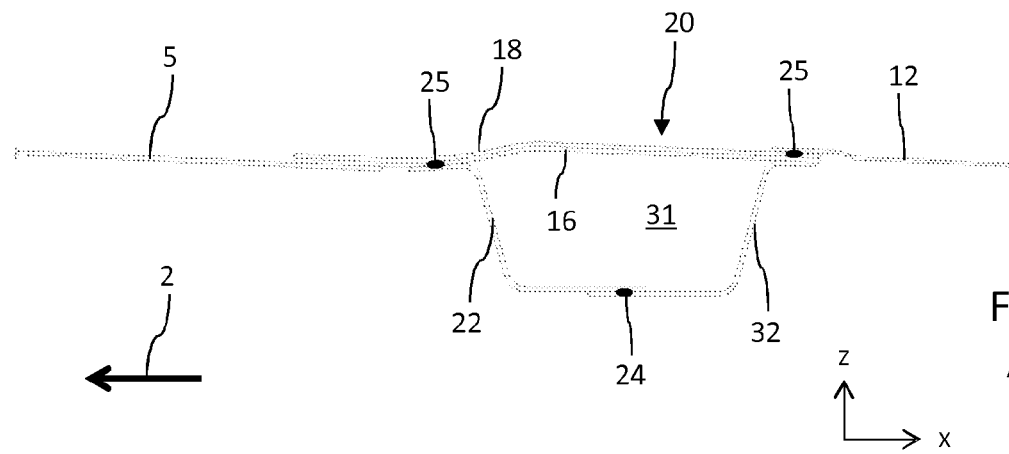
FIG. 6 is a cross-section A-A through the floor structure according to FIG. 5.

It must be noted, furthermore, that the two reinforcement profiles 16, 18 shown in FIG. 2 for example together with the insert piece 22 form a closing plate for the cross member 32, so that from the two reinforcement profiles 16, 18, the front cross member 32 and the insert piece 22 fastened hereon a hollow profile 31 shown in cross section in FIG. 6 can be formed. Towards the front, adjoining hereon in travelling direction 2, the center tunnel 5 penetrating the front wall 3 of the floor structure 1 extends, while against the travelling direction 2, adjoining the closed hollow profile 31, the middle floor section 12, which is elevated with respect to a front floor section 11, follows.

Figure 4:
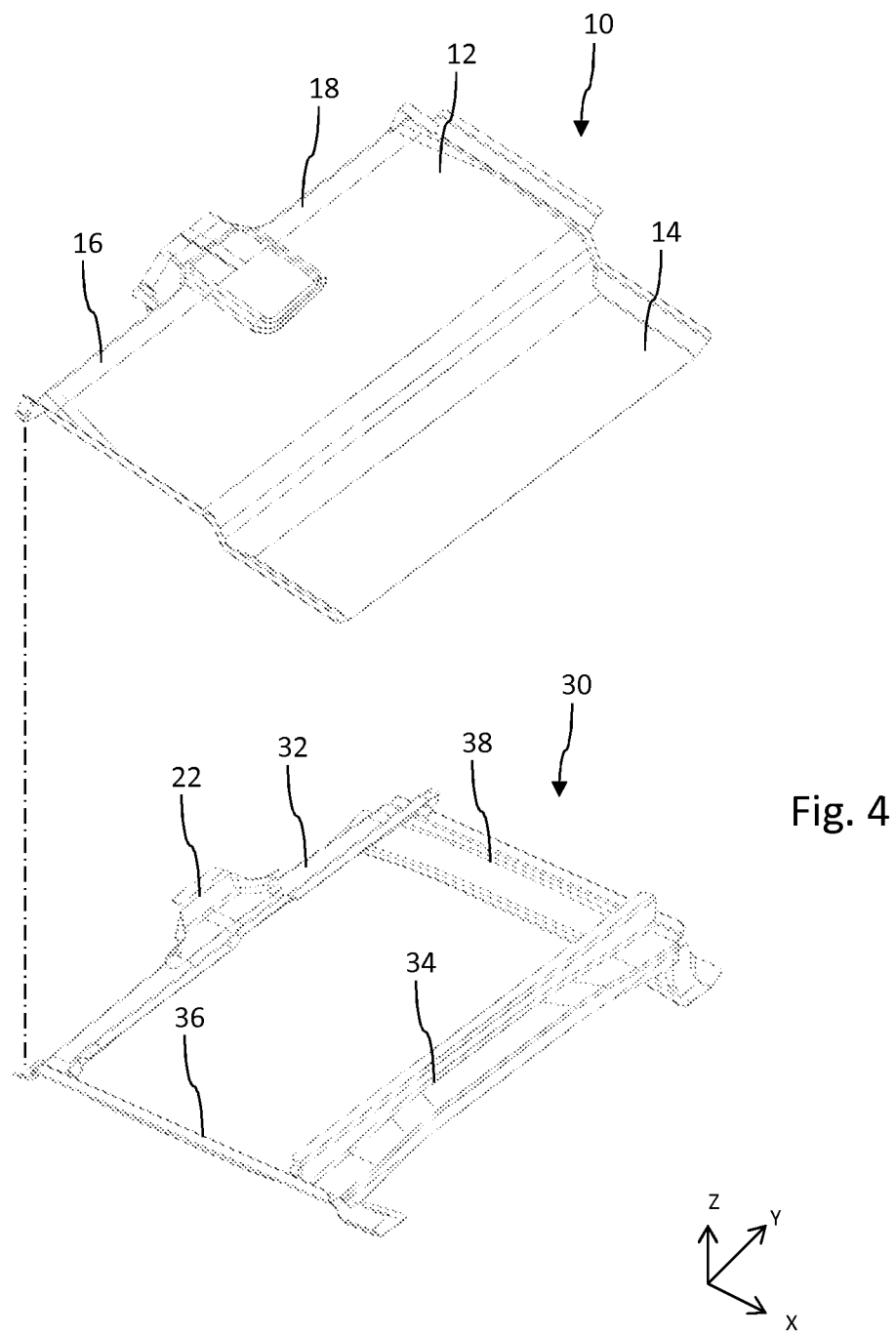
FIG. 4 is a representation of the support frame corresponding to FIG. 3 with the floor panel located above.

FIG. 4 shows the formation of a floor module 50 in perspective representation. The floor panel 10 provided with the reinforcement profiles 16, 18 in this case is connected to the support frame 30 in such a manner that the reinforcement profiles 16, 18 come to lie in the region of the front cross member 32 and that a shoulder which is formed between elevated floor panel section 12 and rear floor panel section 14 comes to lie in the region of the rear cross member 34.

In this regard, the middle floor panel section 12 which with respect to a front floor panel section 11 and a rear floor panel section 14 is formed elevated can be supported by the two cross members 32, 34 and suitably carried. The elevated floor panel section 12 which is formed opposite the front floor panel section 11 and rear floor panel section 14 can serve for the space-saving housing of motor vehicle components, for example, of energy storage devices.

Figure 5:
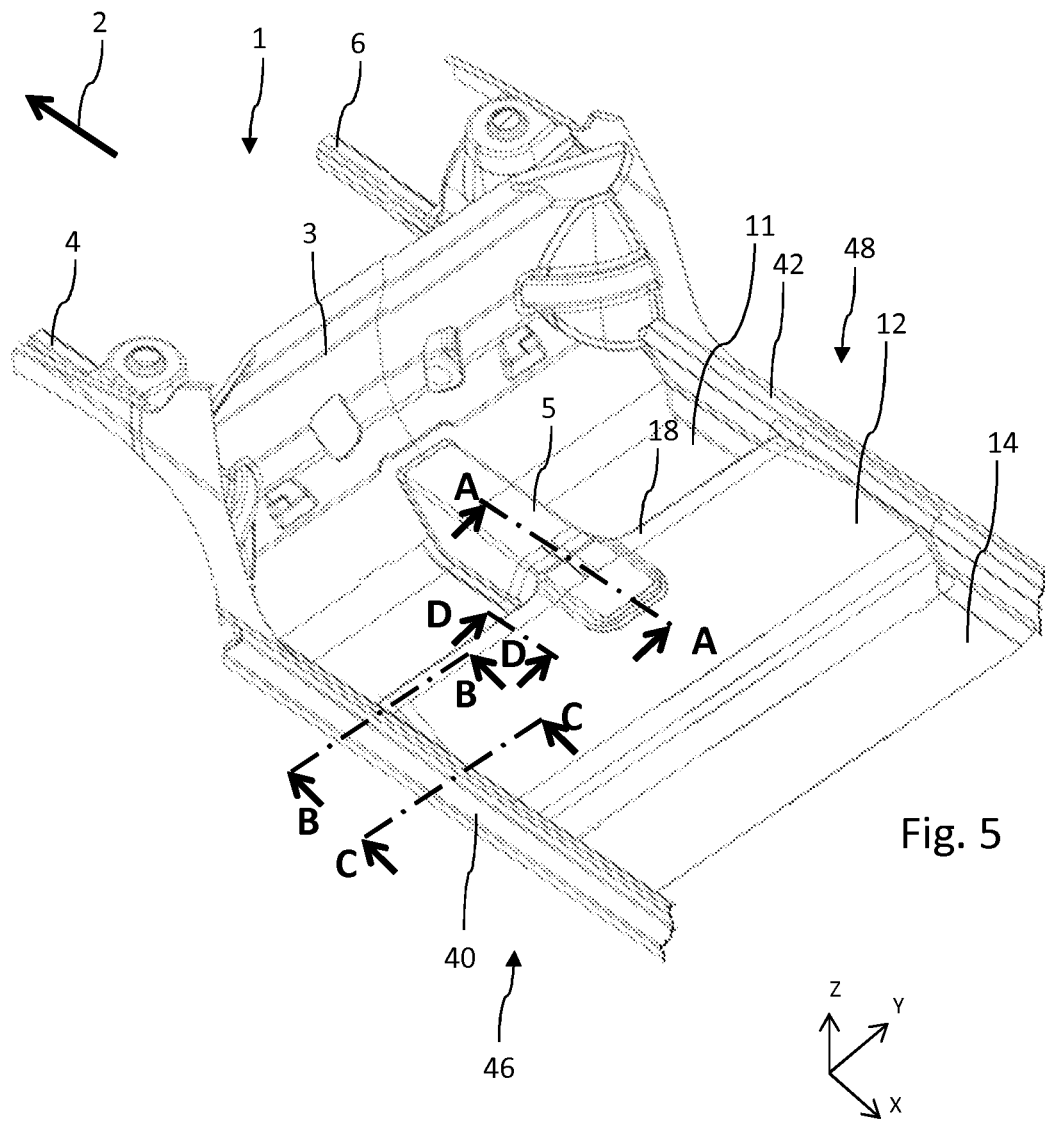
FIG. 5 is a representation of the entire floor structure which with respect to its perspective is comparable to FIGS. 3 and 4.

The floor module 50 formed by the floor panel 10 and the support frame 30 can then be connected as a preassembly unit in one piece to the remaining components of the floor structure 1, to their side member arrangements 46, 48. A final assembly state in this case is shown in FIG. 5. The floor structure 1 shown there includes two front side members 4, 6, which adjoin a front wall 3 from the front, and which extend along lateral side sill profiles 40, 42.

Figure 7:
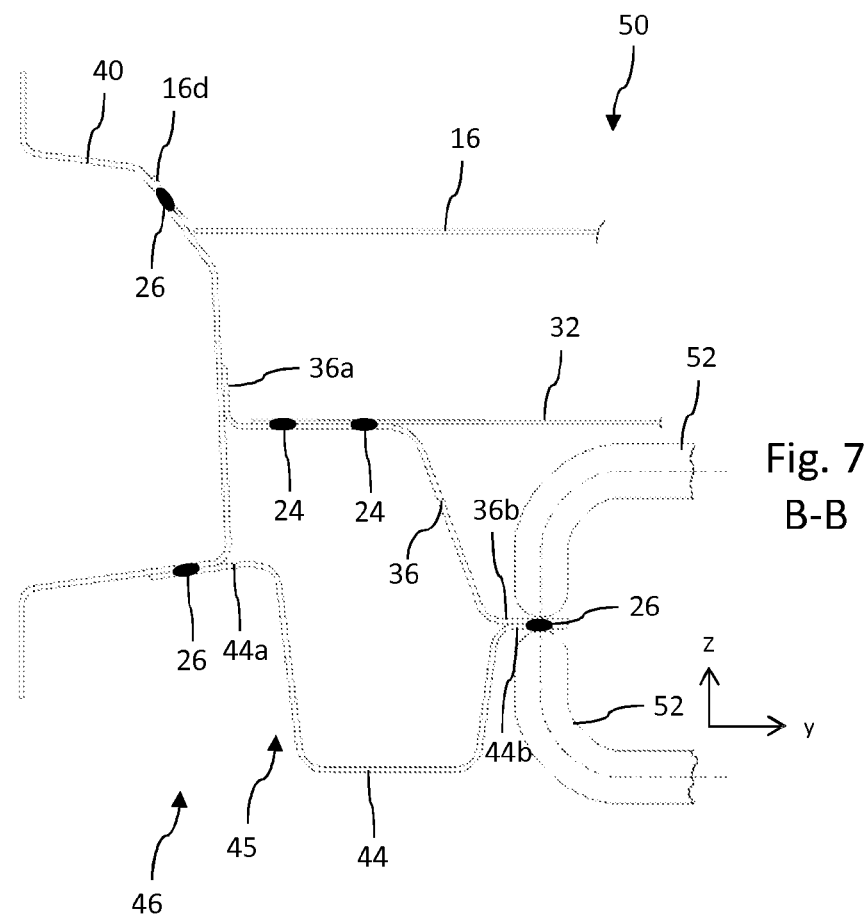
FIG. 7 is a cross-section B-B through the floor structure according to FIG. 5.

FIG. 7 shows the connection of the floor module 50 to the side sill profile 40 and the longitudinal frame profile 44 with the help of the left side member arrangement 46. That cross section B-B in this case extends through the front cross member 32. For forming the floor module 50, the front cross member 32 is connected to the lateral profile part 36 via two spot welds 25 which are merely shown exemplarily. Here, the profile part 36, as is evident from the cross section of FIG. 7, simultaneously acts as closing plate for the longitudinal frame profile 44 extending along the side sill profile 40.

The longitudinal frame profile 44 has a U-profile like configuration that is open at the top. With a flange section 44a projecting outwardly it adjoins the side sill profile 40 which is formed approximately C-like in cross section from the bottom. Oriented located opposite, towards the vehicle middle, the longitudinal frame profile 44 has a flange section 44b which approximately extends in horizontal direction. A flange section 36b of the profile part 36 which is correspondingly formed comes to lie on that flange section 44b, wherein the profile part 36 located opposite, i.e. towards the outside of the motor vehicle, has a flange section 36a extending approximately in vehicle vertical direction (z). By means of the flange section 36a, the profile part 36 acting as a closing plate supports itself on the side sill profile 40 in vehicle transverse direction.

Viewing FIGS. 2 and 7 together it is evident that the reinforcement profile 16 also directly supports itself on the side sill profile 40 with a flange section 16d obliquely projecting away upwardly, so that the reinforcement profile 16 in this case can also be directly connected to the side sill profile 40 for example by means of a spot weld 26.

Because the profile part 36 which acts as a closing plate supports itself over its entire longitudinal extension in vehicle longitudinal direction (x) on the inner side sill profile as well as on the longitudinal frame profile 44 adjoining thereon and running along the side sill profile 40, a comparatively large or longitudinally extended connecting region 45 to the side member arrangement 46, 48 can be provided for the cross members 32, 34 which are connected to the profile part 36.

Any transverse forces acting on the floor structure 1 in vehicle transverse direction (y), for example in the middle between the two cross members 32, 34, can be distributed over the adjoining cross members 32, 34 via the profile part 36 through its direct arrangement along the side member arrangement 46, 48.

In the cross section according to FIG. 7, two welding tools 52 are indicated furthermore by means of which the flange sections 44b, 36b of the longitudinal frame profile 44 which come to lie on top of one another and of the profile part 36 can be connected. In a similar manner, the cross section according to FIG. 8 shows the formation of spot welds 26 for the direct fastening of the floor panel section 12 to the side sill profile 40 and of the flange section 36a of the profile part 36 to the side sill profile 40.

Figure 8:
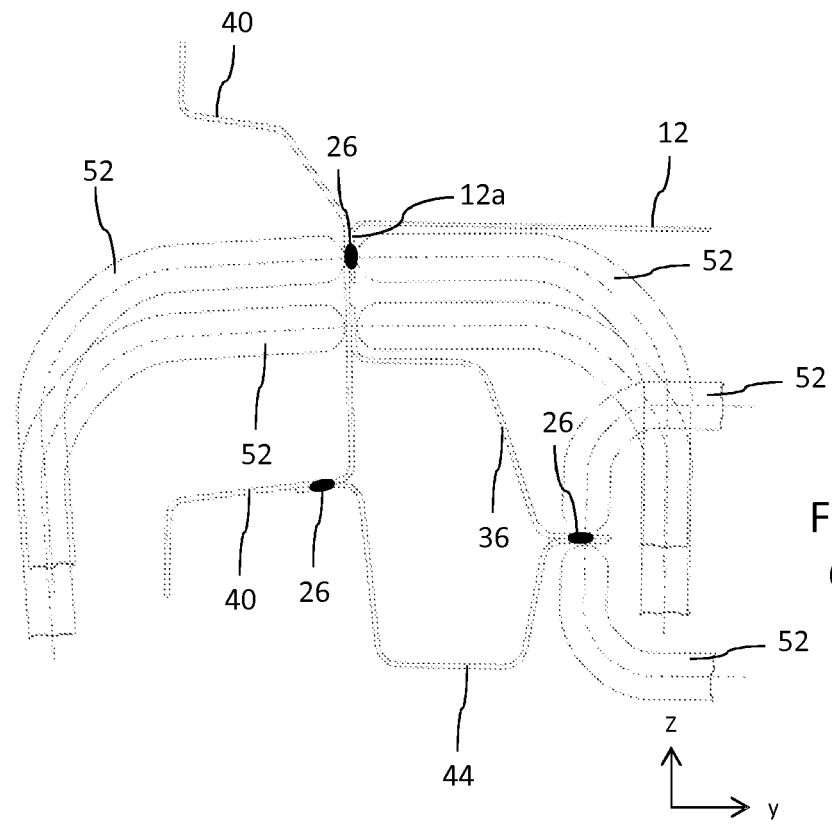
FIG. 8 is a cross-section C-C through the floor structure according to FIG. 5.

In modification of the configuration shown in FIG. 7, the lateral flange section 16d of the reinforcement profile can also extend downwards and thus, comparable to the flange section 12a of the floor panel section 12 shown in FIG. 8, come to lie against the interior sill profile 40. Conversely, the flange section 12a shown in FIG. 8 can also extend upwardly and support itself on the inner sill profile corresponding to the flange section 16d shown in FIG. 7.

Figure 9:
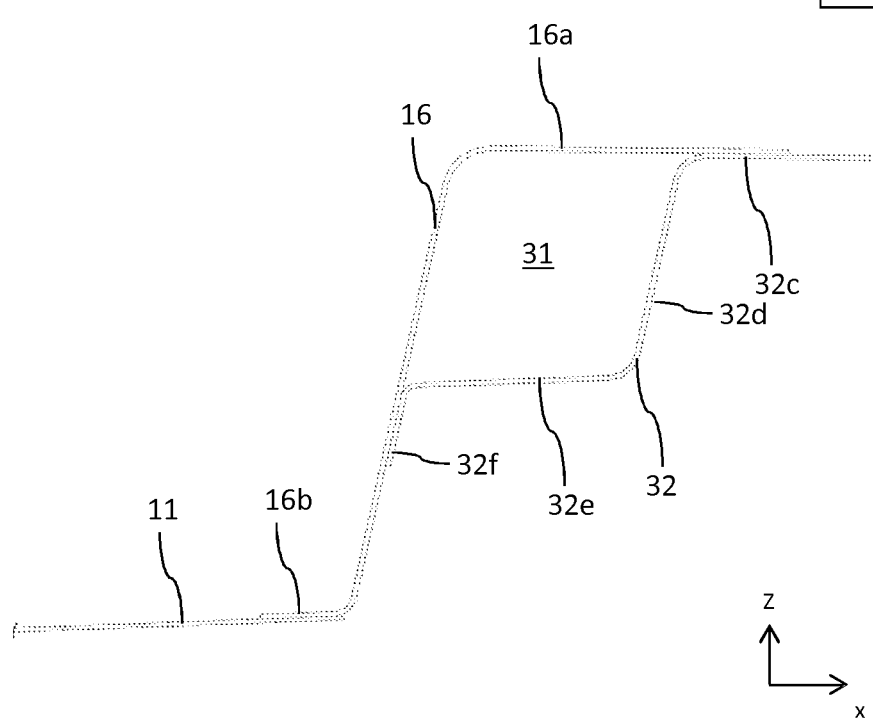
FIG. 9 is a cross-section D-D through the floor structure according to FIG. 5.

The cross section D-D according to FIG. 9 furthermore shows a cross section through the floor structure 10 which is offset compared with FIG. 6 in vehicle transverse direction (y). There, the reinforcement 16 which is formed approximately Z-shaped in cross section is shown with an upper horizontal flange section 16a and with a lower horizontal flange section 16b. While the reinforcement profile 16 supports itself on the front floor panel section 11 with its lower flange section 16b facing towards the front, the transition to the upper flange section 16a horizontally projecting towards the back opposite to the travelling direction, is provided with the cross member 32 arranged below.

As shown in FIG. 9, the cross member 32, similar to the rear cross member 34 already described in FIG. 3, also has a double L-shaped cross-sectional profile with upper and lower flange section 32c, 32f and profile sections 32d, 32e located in between. Through the geometrical configuration of front cross member 32 and the reinforcement profiles 16, 18 a hollow profile 31 which is merely formed by the respective reinforcement profile 16, 18 and the cross member 32 can also be provided outside the region of the insert piece 22.

Finally it must be noted that the connecting spots or spot welds indicated with the reference numbers 24, 25 and 26 reflect the assembly sequence of the floor structure 1. In a first step, the cross members 32 shown in FIG. 3 are thus connected to one another with the profile parts 36, 38 located opposite by means of spot welds 24. In the same operation, the insert piece 22 is also arranged on the front cross member 32 and structurally connected herewith.

Parallel to this and independently of the forming of the support frame 30, the elevated floor panel section 12 can be connected to the reinforcement profiles 16, 18 as indicated in FIG. 1.

In a following operation and subject to forming spot welds or connecting points 25, the assembly of the preconfigured floor panel 10 to the support frame 30 is provided. Here, the floor panel 10, and in particular its floor panel section 12 which is formed elevated is connected to the cross members 32, 34, as well as to the profile parts 36, 38, as is indicated by the spot welds according to FIGS. 6 and 7.

This is followed by the installation of the floor module 50 obtained in this way in the motor vehicle body or in the floor structure 1. In a last operation, the spot welds 26 are placed, by means of which the floor module 50 is connected to the lateral side member arrangements 46, 48.

Figure 10:
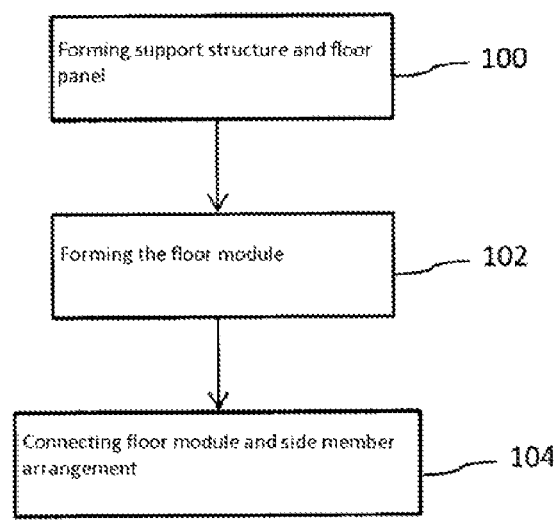
FIG. 10 is a flow diagram for carrying out the production method.

Finally, the method for producing the floor structure 1 is again briefly sketched in FIG. 10. Block 100 represents a first step to form the support structure and base plate. In the first step 100, the support structure 30 which is shown isolated in FIG. 3 is formed with the two cross members 32, 34 which are spaced from one another in vehicle longitudinal direction (x) and substantially extend in vehicle transverse direction (y). In step 100, the opposite end sections 32a, 34a, 32b, 34b of the two cross members 32, 34 are connected each to profile parts 36, 37 substantially extending in vehicle longitudinal direction (x). Block 102 represents a second step to form the floor or bottom module. In the second step 102, the floor panel 10 which is preconfigured if applicable according to FIG. 1 is connected to the previously formed support structure 30 for forming a floor module 50. Block 104 represents a third step to connect the floor or base module and longitudinal beams. In the third step 104 the floor module 50 thus formed is connected to the two side member arrangements 46, 48.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents.

What is claimed is:

1. A floor structure of a motor vehicle body comprising:
 a floor panel; and
 a support structure which is arranged below the floor panel and secured to the floor panel, the support structure comprising:
  two cross members substantially extending in a vehicle transverse direction (y) and spaced from one another in a vehicle longitudinal direction (x), each cross member terminating at an end section;
  wherein the two cross members comprise:
   a first cross member having first and second lateral end sections and a vertically oriented profile section which diverges from a middle section to the lateral end sections; and
   a second cross member spaced from the first cross member and having first and second lateral end sections;
  wherein the profile part comprises:
   a first profile part configured to extend along a first side member of the motor vehicle body substantially in a vehicle longitudinal direction (x), the first profile part interconnecting a first lateral end section of the first and second cross members; and
   a second profile part configured to extend along a second side member substantially in the vehicle longitudinal direction (x), the second profile part interconnecting a second lateral end section of the first and second cross members; and wherein end sections of the cross members facing the same vehicle side are connected to one another via a profile part, the profile part extending substantially in vehicle longitudinal direction (x) and extending along a side member for support thereon, wherein the side member comprises an inner side sill profile and a longitudinal frame profile, and wherein the profile part is formed as a closing plate for the longitudinal frame profile.

2. The floor structure according to claim 1, wherein the profile part supports itself on an inside of the inner side sill profile.

3. The floor structure according to claim 2 wherein the profile part is formed as a closing plate for a longitudinal frame profile.

4. The floor structure according to claim 1, wherein the cross members and the profile parts connected herewith form a closed support frame for the floor panel to be fastened thereon.

5. The floor structure according to claim 1, wherein a front end section of the floor panel is connected to a left and to a right reinforcement profile, wherein left and right reinforcement profile are positioned on opposite sides of a center tunnel.

6. The floor structure according to claim 5, further comprising a structure-reinforcing insert piece arranged between a front cross member and at least one of the left or right reinforcement profiles.

7. The floor structure according to claim 6, wherein left and right reinforcement profile are concavely curved to adjoin at least one of the center tunnel and the insert piece.

8. The floor structure according to claim 5, wherein left and right reinforcement profile are concavely curved to adjoin at least one of the center tunnel and the insert piece.

9. The floor structure according to claim 5, wherein the outer ends of the reinforcement profiles support themselves on an inner sill profile.

10. The floor structure according to claim 5, wherein a front cross member of the two cross members and at least one of the right or left reinforcement profiles form a closed hollow profile.

11. The floor structure according to claim 1, wherein the side member in a connecting region in which it lies against the profile part is formed continuously and without through-openings.

12. The floor structure according to claim 1, where at least one of the cross members in a connecting region adjoining the profile part has across-sectional profile that becomes larger.

13. The floor structure according to claim 1, wherein a front end section of the floor panel is connected to a left and to a right reinforcement profile, wherein left and right reinforcement profile are positioned on opposite sides of a center tunnel.

14. The floor structure according to claim 1, wherein the first side member in a connecting region in which it lies against the first profile part is formed continuously and without through-openings.

15. The floor structure according to claim 1, where at least one of the first cross member and the second cross member in a connecting region adjoining the first profile part has a cross-sectional profile that becomes larger.

* * * * *